United States Patent [19]

Ozaki et al.

[11] Patent Number: 5,032,980
[45] Date of Patent: Jul. 16, 1991

[54] INFORMATION PROCESSING SYSTEM WITH INSTRUCTION ADDRESS SAVING FUNCTION CORRESPONDING TO PRIORITY LEVELS OF INTERRUPTION INFORMATION

[75] Inventors: Seiichi Ozaki, Koganei; Kenichi Wada, Sagamihara; Shigeki Morimoto, Hadano, all of Japan

[73] Assignee: Hitachi, Ltd., Tokyo, Japan

[21] Appl. No.: 241,375

[22] Filed: Sep. 7, 1988

[30] Foreign Application Priority Data

Sep. 10, 1987 [JP] Japan .................. 62-227280

[51] Int. Cl.$^5$ .............................................. G06F 9/40
[52] U.S. Cl. ................ 364/200; 364/261.3; 364/261.4; 364/262.8
[58] Field of Search ... 364/200 MS File, 900 MS File

[56] References Cited

U.S. PATENT DOCUMENTS

| | | | |
|---|---|---|---|
| 3,789,365 | 1/1974 | Jen et al. .............................. | 364/200 |
| 4,001,783 | 1/1977 | Monahan et al. ..................... | 364/200 |
| 4,034,349 | 7/1977 | Monaco et al. ...................... | 364/200 |
| 4,179,737 | 12/1979 | Kim ..................................... | 364/200 |
| 4,621,342 | 11/1986 | Capizzi et al. ...................... | 364/900 |

OTHER PUBLICATIONS

Outline Book of HITAC H-8633-2/3 Type Communication Control Processing System, 8080-1-007, 1983 (No translation available).

*Primary Examiner*—David Y. Eng

*Attorney, Agent, or Firm*—Fay, Sharpe, Beall, Fagan, Minnich & McKee

[57] ABSTRACT

A level machine information system is provided with an instruction register for storing an address of an instruction read out from an instruction memory, an instruction decoder for producing control signals complying with the instruction read out, a calculator for producing a new address of an instruction to be executed next on the basis of the address outputted from the instruction register, an instruction length code supplied from the decoder as the control signals, a plurality of first registers for saying the address outputted from the instruction register, a plurality of second registers for saving the new address, a controller and a selector for supplying the instruction register with the new address, the saved new address and fixed addresses each indicating the head of interruption programs in the instruction memory. The first and second registers correspond to all but the highest interruption priority level. Upon an acknowledged interruption request, the controller controls the first and second registers and selector to save the new address of the calculator and the old address of the instruction register in one of the first and second registers corresponding to the priority levels of an interrupted process, respectively. One of the fixed addresses corresponding to a process to be executed for the interruption request is transferred in the instruction register. If necessary, the contents of the first and second registers are referenced by the process to detect the reasons for the interruption.

13 Claims, 14 Drawing Sheets

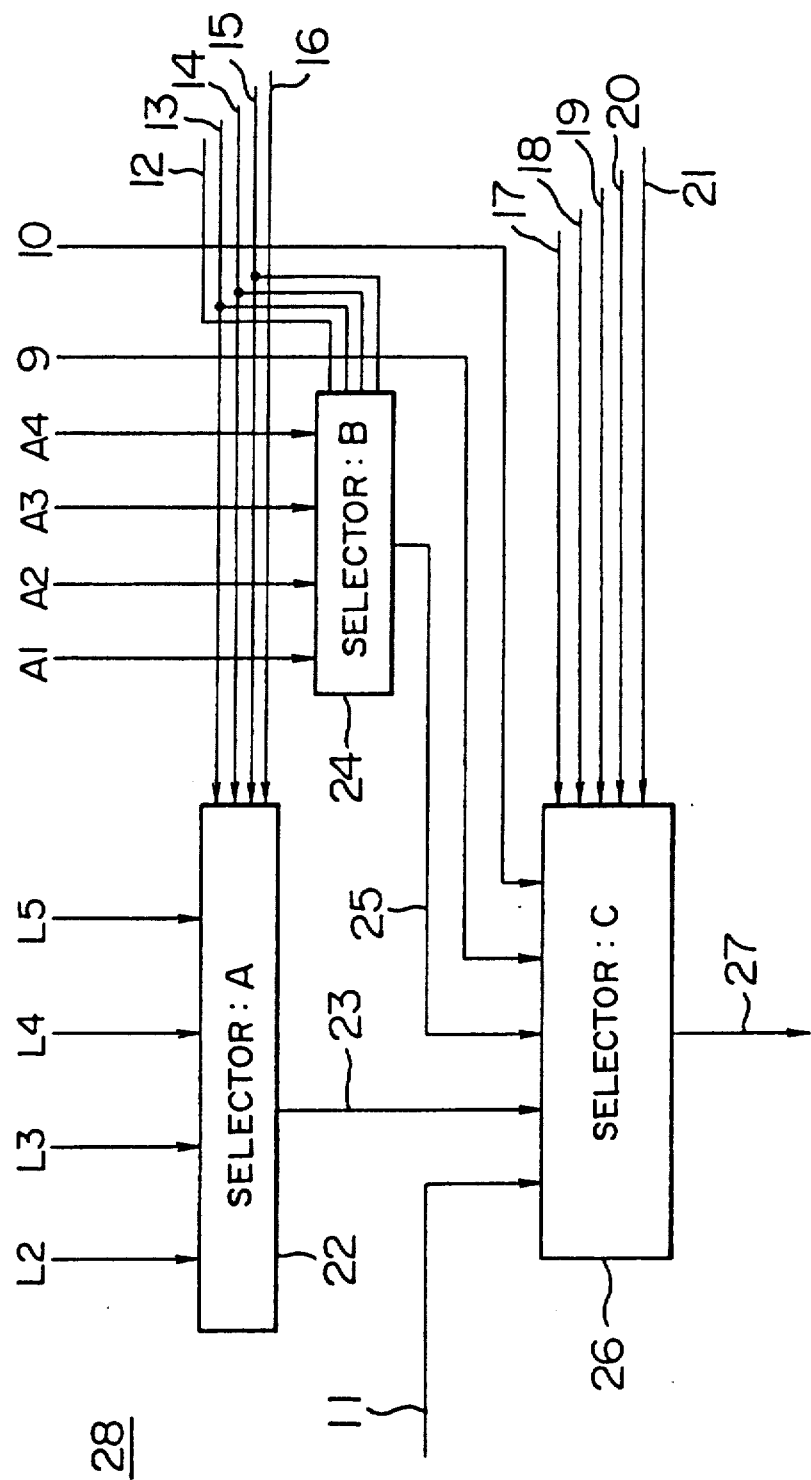

FIG. 3A

| | SIGNAL | | | | |
|---|---|---|---|---|---|
| OLD IAR OF LEVEL-5 : L5 | | | | | |
| OLD IAR OF LEVEL-4 : L4 | | | | | |
| OLD IAR OF LEVEL-3 : L3 | | | | | |
| OLD IAR OF LEVEL-2 : L2 | | | | | |
| PROCESS LEVEL SIGNAL FOR LEVEL-2 | 13 | 1 | | | |
| PROCESS LEVEL SIGNAL FOR LEVEL-3 | 14 | | 1 | | |
| PROCESS LEVEL SIGNAL FOR LEVEL-4 | 15 | | | 1 | |
| PROCESS LEVEL SIGNAL FOR LEVEL-5 | 16 | | | | 1 |

FIG. 3B

| | SIGNAL | | | | |
|---|---|---|---|---|---|
| START ADDRESS OF LEVEL-4 PROCESS : A4 | | | | | |
| START ADDRESS OF LEVEL-3 PROCESS : A3 | | | | | |
| START ADDRESS OF LEVEL-2 PROCESS : A2 | | | | | |
| START ADDRESS OF LEVEL-1 PROCESS : A1 | | | | | |
| PROCESS LEVEL SIGNAL FOR LEVEL-1 | 12 | 1 | | | |
| PROCESS LEVEL SIGNAL FOR LEVEL-2 | 13 | | 1 | | |
| PROCESS LEVEL SIGNAL FOR LEVEL-3 | 14 | | | 1 | |
| PROCESS LEVEL SIGNAL FOR LEVEL-4 | 15 | | | | 1 |

FIG. 3C

| START ADDRESS : 25 |
| --- |
| OLD IA : 23 |
| BRANCH ADDRESS : 10 |
| UPDATE ADDRESS : 11 |
| IPL START ADDRESS : 9 |

| | | | | | | |
|---|---|---|---|---|---|---|
| 1 | IPL START SIGNAL : 19 | 1 | | | | |
| 2 | IAR UPDATE SIGNAL : 20 | | 1 | | | |
| 2 | BRANCH SIGNAL : 21 | | | 1 | | |
| 2 | OLD IAR → IAR SIGNAL : 17 | | | | 1 | |
| 2 | START ADDRESS → IAR SIGNAL : 18 | | | | | 1 |

↑
PRIORITY LEVEL

FIG. 5

SIGNAL 36

| | OPERATION |
|---|---|
| 1 | (OLD LEVEL REGISTER 33) + (PROCESS LEVEL SIGNALS 12~15) |
| 0 | (OLD LEVEL REGISTER 33) − (PROCESS LEVEL SIGNALS 12~15) |

|  | | LEVEL: | 4 | 3 | 2 | 1 | |
|---|---|---|---|---|---|---|---|
| FIG. 9A | $T_0 - T_2$ | | 0 | 0 | 0 | 0 | ~33 |
| FIG. 9B | $T_4 - T_6$ | | 0 | 0 | 1 | 0 | ~33 |
| FIG. 9C | $T_8 - T_{10}$ | | 0 | 0 | 1 | 1 | ~33 |
| FIG. 9D | $T_{12} - T_{13}$ | | 0 | 0 | 1 | 0 | ~33 |
| FIG. 9E | $T_{15} - T_{16}$ | | 0 | 1 | 0 | 0 | ~33 |
| FIG. 9F | $T_{18} - T_{20}$ | | 0 | 0 | 0 | 0 | ~33 |

F I G. 10
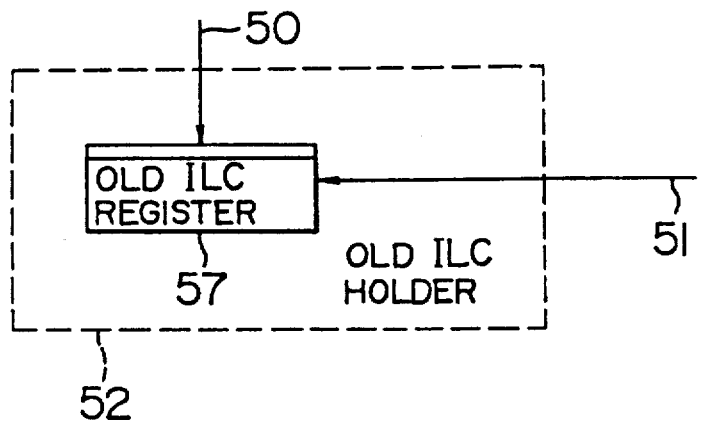
F I G. 11
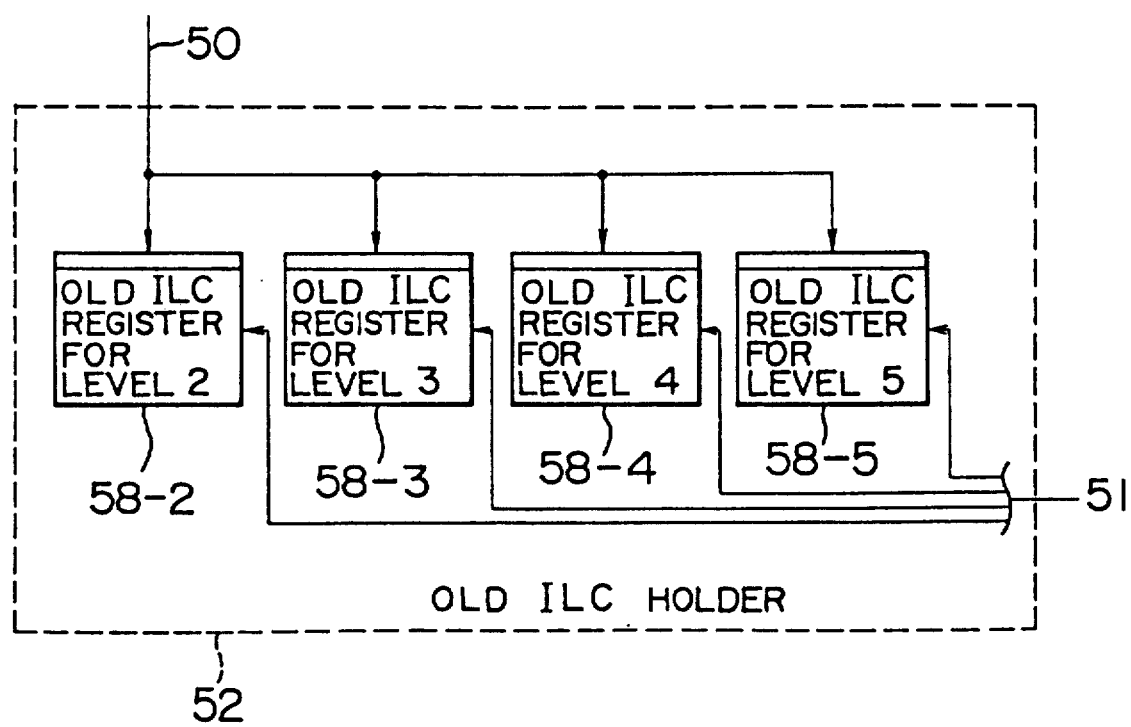

FIG. 13
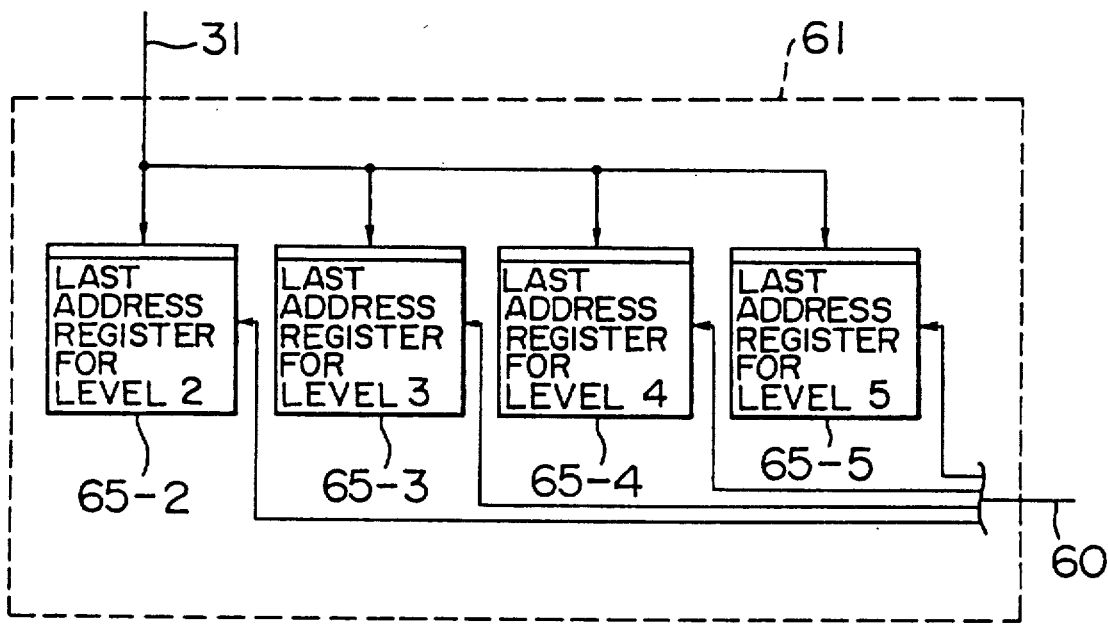
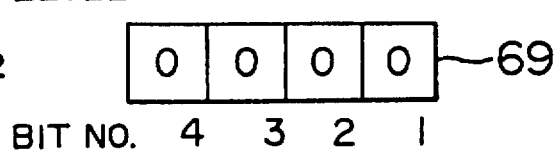
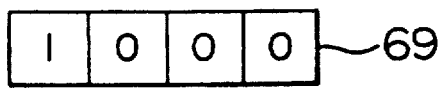
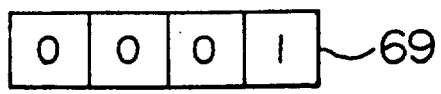

INFORMATION PROCESSING SYSTEM WITH INSTRUCTION ADDRESS SAVING FUNCTION CORRESPONDING TO PRIORITY LEVELS OF INTERRUPTION INFORMATION

BACKGROUND OF THE INVENTION

This invention relates to information processing systems and more particularly to a level machine type information processing system having a group of general purpose registers respectively corresponding to interruption process levels and being able to respond to an interruption to rapidly switch a processing on one level to a processing on another level.

In handling a plurality of interruption levels in an ordinary information processing system, when an interruption occurs during processing on a certain level, the interruption is permitted to be executed if it has higher priority than the presently processed level. For execution of the interruption, an address of an instruction next to an instruction presently executed and the contents of a general purpose register presently used have to be saved. Accordingly, some main memory areas or a plurality of save registers are needed and the save processing adds to processing time correspondingly.

Contrary to this, in an information processing system dedicated to level processing, a group of general purpose registers corresponding to interruption levels are provided, a level is processed using a general purpose register corresponding to that level and when an interruption causes processing to shift from one level to another, a general purpose register corresponding to the destined level is used, thereby eliminating the necessity of save and recovery processing of the contents of the general purpose register to and from the main memory.

An example of prior art level machine type information processing system is described as a central controller (CC) in an outline book of HITAC H-8633-§ type Communication Control Processing System, 8080-1-007, 1983.

Such a level machine type information processing system has instruction address registers (IAR's) corresponding to levels and a single lagging address register (LAR) provided in association with the IAR's. During processing of a level other than the level of the highest priority, an address of an instruction which precedes by one an instruction designated by an IAR is stored in the LAR and the contents of the LAR is updated concurrently with update of the contents of the IAR.

Upon occurrence of an interruption toward the level of the highest priority to a processing on a level other than the level of the highest priority, an address of an instruction executed immediately before the occurrence of the interruption or an address of an instruction preceding that executed instruction is stored in the LAR and update of the LAR is stopped when the interruption toward the level of the highest priority occurs. This ensures that after start of a processing on the level of the highest priority, the address of the instruction processed immediately before the interruption can be determined from the contents of the LAR.

The above prior art system has, however, the following disadvantages.

In the first place, since the prior art system is such that only when an interruption toward the level of the highest priority occurs, an address of an instruction executed immediately before the occurrence of the interruption can be held in the LAR, an address of an immediately previously executed instruction can not be obtained from the LAR when an interruption toward other level than the level of the highest priority occurs. Therefore, the prior art system can not realize a hierarchial structure for a routine wherein a predetermined processing is carried out by referring to the state of a preceding process level which is pausing, for example, an error recovery routine. When taking a program interruption, for instance, an interruption due to an error of program is an abnormal phenomenon but an interruption due to page absence is not an abnormal phenomenon. Accordingly, it is desirable that these interruptions be processed on different levels. Preferably, the interruption process due to an error of program may be allocated to, for example, the level of the highest priority (level 1) and the interruption process due to page absence may be allocated to for example, a level which is second in priority (level 2). In the prior art system, when an error of program occurs and an interruption toward the level 1 takes place during a processing on a certain level, an address of an instruction, on the interrupted level, which raises the error can be known by examining the contents of the LAR during a processing on the level 1. But when the page absence occurs and an interruption toward the level 2 takes place, an address of an instruction, on the interrupted level, which raises the page absence can not be known during a processing on the level 2. Accordingly, with the prior art system, in order for an interrupting process routine executed during page absence to know an address of an instruction which raises the page absence, priority of the level 1 has to be given to the interrupting process routine, thus preventing hierarchy of interruption processes and realization of software simplified for preparation and maintenance.

In the second place, the EXECUTE instruction generally used in the general purpose computer can not be added to the instruction set of the prior art system and the instruction set can not be used in common for both the system for general purpose and system dedicated to level processing. This problem will be explained with reference to FIGS. 16 and 17.

In the prior art system, an EXIT instruction issued on the level of the lowest priority (level 5) is so prescribed as to be a supervisor call (SVC) toward or destined for a level which is higher in priority than the level 5 by one, that is, level 4 and accordingly, when an EXIT instruction 140 is issued at an A address 142 in a routine on the level 5 as shown in FIG. 16, an interruption occurs and the processing shifts to the level 4. An interruption decision circuit examines the contents of an interruption factor register to know that the interruption factor is the SVC. In this case, a B address (head address of parameter 141) 143 is recorded in an IAR corresponding to the level 5 and therefore the parameter 141 can be used during a processing on the level 4. Further, since the length of the parameter 141 per se is also recorded in the parameter 141, a C address 144 (=B address+parameter length) standing for a return address to the processing on level 5 can be known.

Assume now that an EXECUTE instruction is added to an instruction set. The EXECUTE instruction is defined such that when this instruction is executed, an instruction at an address designated within the EXECUTE instruction, that is, a target instruction is partly changed using a general purpose register designated within the EXECUTE instruction and then, the target instruction is executed.

The interruption toward the level 4 by the SVC may occur in either of mode (a) due to an EXIT instruction alone (see FIG. 16) and mode (b) due to a target instruction of EXECUTE instruction standing for an EXIT instruction (see FIG. 17) but the two modes can not be discriminated from each other.

The instruction length of the EXIT instruction is of 2 bytes but the EXECUTE instruction required to designate an address of the target instruction and an address of the general purpose register has a length longer than that of the EXIT instruction. Because of the difference in length between EXIT and EXECUTE instructions 151 and 150, in the mode (b), an A address 153 in FIG. 17 can not be determined from the contents of an IAR for level 5 (recording a B address 154 in FIG. 17) during a processing on the level 4. Accordingly, a D address 155 can not be determined, either, resulting in a failure to use a parameter 152 and it is undetermined whether the B address stands for a return address to a processing on the level 5.

For the reasons described previously, the EXECUTE instruction can not be added to the instruction set in the prior art level machine. However, the EXECUTE instruction has many applications and is exemplarily used when data of different lengths can be moved, with the procedure part of program inhibited from being written, by defining a target instruction of the EXECUTE instruction as a move character (MVC) instruction and designating a length of data to be moved according to the MVC instruction by a value in a general purpose register designated by the EXECUTE instruction. The variable length processing is frequently used in various software processings including a processing of fields having different lengths dependent on packets in a packet header, which processing occurs in software for communications (for example, address fields of X.25 layer 3).

Accordingly, when the EXECUTE instruction is not permitted to be used, the procedure part of program has to be rewritten each time movement of data of different lengths is effected and must not be inhibited from being written, which may cause runaway of the program.

In another application, the EXECUTE instruction is used in a program for tracing a program, that is, a tracer.

The tracer has the following four portions (a) to (d):

(a) Operation resembling instruction execution operation effected using hardware in the ordinary information processing system and including recognition and and inspection of an instruction code of an instruction, scheduled to be executed in a program to be traced, and of register and memory area used is carried out, the instruction code is recorded in order to record which instruction is executed, and other necessary information is recorded;

(b) The above instruction is actually executed under the direction of the EXECUTE instruction;

(c) After execution of the instruction, the contents of the general purpose register, memory area, condition code, and so on are recorded; and (d) The contents of the register designating the address of the instruction is updated in order that an instruction to be executed subsequently to the above instruction can be traced, and the procedure is returned to the portion (a).

By using such a tracer, record of various kinds of information unavailable from a tracer based on hardware can be obtained to simplify preparation and maintenance of programs. However, when the use of the EXECUTE instruction is not permitted, the aforementioned tracer can not be prepared.

SUMMARY OF THE INVENTION

An object of this invention is to provide a level machine type information processing system in which an interrupting processing on any level can look up a process state on another interrupted level.

Another object of this invention is to provide a level machine type information processing system which permits hierarchy of interruption routine processings including an error processing.

Still another object of the invention is to provide a level machine type information processing system suitable for handling the instruction set usable in common for a general purpose computer.

According to the invention, to accomplish the above objects, there is provided a level machine type information processing system in which a plurality of sets of registers each set corresponding to each of process levels of different priorities are provided so that when an interruption request toward a level of higher priority than that of a level presently executed occurs, the registers are switched to execute a processing corresponding to the interruption request, the system comprising first memory means for storing a plurality of instructions forming the respective processings, an instruction address register for delivering an address of an instruction to be executed, instruction decoder means for reading one instruction out of the first memory means in accordance with the instruction address delivered out of the instruction address register so as to produce a plurality of control signals complying with the instruction, means responsive to an output signal of the instruction decoder to generate an address of an instruction to be inputted to the instruction address register and executed next, at least one first register means connected to the instruction address register, and control means for comparing, when an interruption request occurs, priority of an interruption request level (interrupting level) with that of a level for a processing presently executed (interrupted level) so as to decide whether the interruption request is acknowledged, the control means being operable, when the interruption request is acknowledged, to store an output address of the instruction address register in the first register and thereafter set an instruction address for execution of the processing corresponding to the interruption request in the instruction address register.

The first register means may comprise a plurality of first registers provided in association with the respective levels excepting the level of the highest priority. In this case, when the interruption request is acknowledged, the control means selects one of the first registers corresponding to the interrupted level presently executed and stores the instruction address in the selected first register.

The first register may also be provided in association with interruption classifications, for example, supervisor and program interruptions. In this case, when the interruption request is acknowledged, the control means selects one of the first registers corresponding to an interruption classification to which the present interruption belongs and stores the instruction address in the selected first register. When the number of the first registers is limited to particular interruption classifications, storage of the instruction address is not effected when an interruption occurs belonging to other classification than the particular interruption classifications.

With the above construction of the present invention, when an interruption request is acknowledged and a processing on another level is executed, it is possible to analyze which instruction has been executed at the time of occurrence of the interruption by consulting the first register means during a processing on the latter level. By providing the first register means in association with each level, an instruction executed, immediately before occurrence of an interruption, on a level which precedes the presently executed level by one or more can be known and the cause of interruption can be analyzed even when interruption routines are hierarchic.

In the information processing system in accordance with the invention, the first register means may store, in place of the address of the instruction executed immediately before the interruption, information indicative of the length of the instruction. Since the information indicative of the instruction length can be obtained as one of control signals of the instruction decoder means in respect of each instruction, the first register means may be connected to one of output lines of the instruction decoder means. When the instruction length information is stored in the first register means, a plurality of second register means corresponding to levels of different priorities are provided so that the control means may store an output address of the address generator means in one of the second register means corresponding to a presently executed level excepting the level of the highest priority. With this construction, on the basis of an address to be executed subsequently which is stored in the second register means and information indicative of the length of a last executed instruction which is stored in the first register means, an address of the last executed instruction can be determined.

Since the instruction length can be encoded into a shorter code than that of the instruction address, the register for storing the instruction length code can be reduced in size as compared to the register for storing the instruction address.

The foregoing and other objects, advantages, manner of operation and features of the present invention will be understood from the following detailed description when read in connection with the accompanying drawings.

BRIEF DESCRIPTION OF THE DRAWINGS

FIG. 2 is a block diagram showing details of a selector 28 in the FIG. 1 system.

FIGS. 3A to 3C are diagrams respectively explaining the function of selectors 22, 24 and 27 in FIG. 2.

FIG. 5 is a diagram useful in explaining the function of an adder/subtracter 34 in the old level holder.

FIGS. 9A to 9F are diagrams showing changes of state of an old level hold register 33 during the interruption processing of FIG. 8.

FIG. 10 is a diagram illustrating another embodiment of an old ILC holder 52 in the FIG. 1 system.

FIG. 11 is a diagram illustrating still another embodiment of the old ILC holder 52 in the FIG. 1 system.

FIG. 13 is a diagram illustrating another embodiment of a last address holder 61 in the FIG. 12 system.

FIGS. 15A to 15C are diagrams showing changes of state of a former level holder 69 in the FIG. 14 system.

DESCRIPTION OF THE PREFERRED EMBODIMENTS

Figure 1:
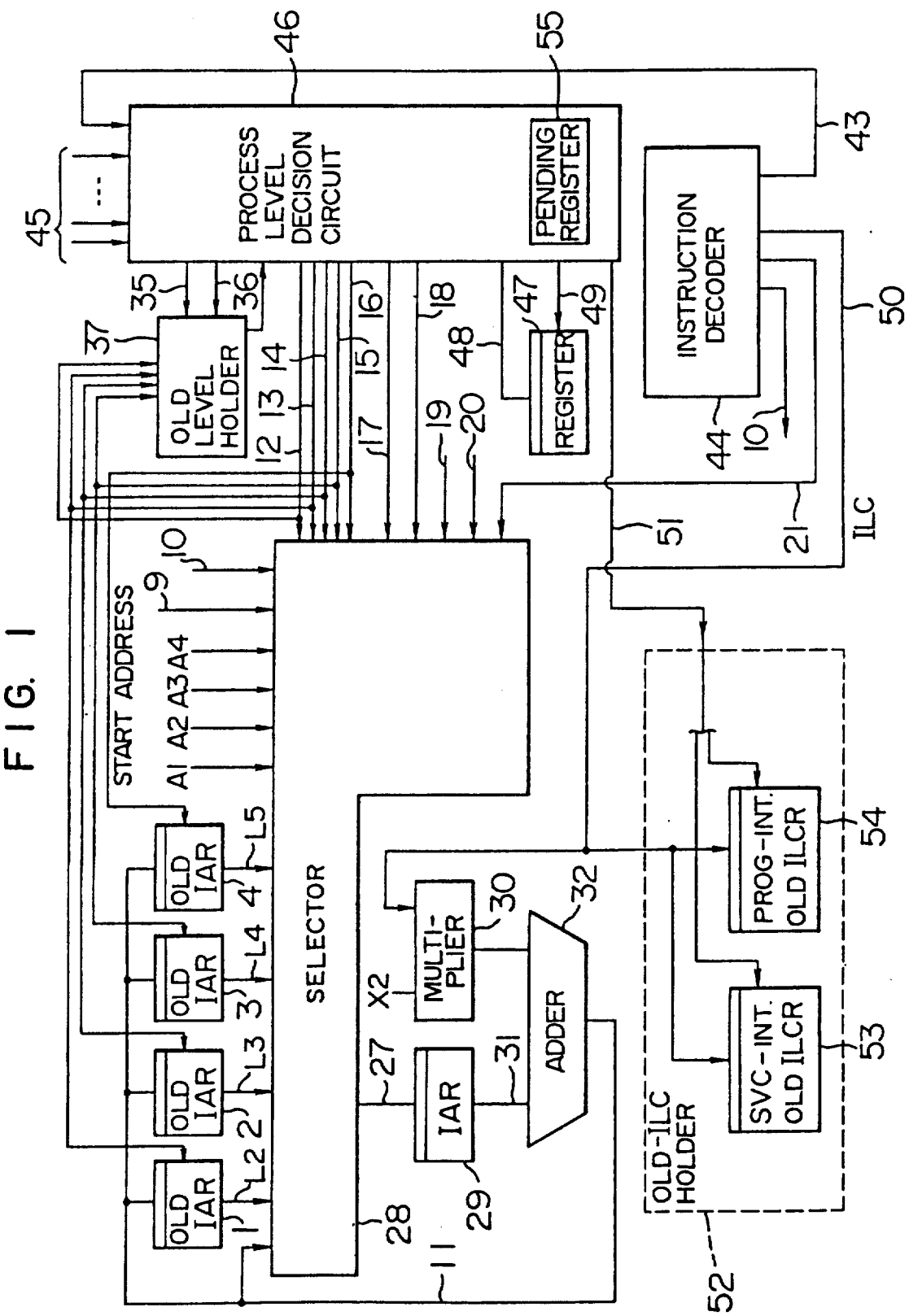
FIG. 1 is a schematic block diagram illustrating a level machine type information processing system according to a first embodiment of the invention.

Referring now to FIG. 1, there is illustrated, in block form, the essential part of a level machine type information processing system according to a first embodiment of the invention. This information processing system has a plurality of sets of general purpose registers respectively corresponding to levels of different priorities but these registers are included in an arithmetic unit not shown. Registers 1 to 4 as shown in FIG. 1 are adapted to hold old instruction addresses on levels 2 to 5, respectively, and abbreviated as OLD IAR's. Taking the OLD IAR 1 for holding an old address on the level 2, for instance, this register updates its value during a processing on the level 2 by storing an address of an instruction next to an instruction being presently processed but stops the update when the processing shifts to a higher level. If no interruption occurs, the OLD IAR 1 records an address of an instruction scheduled to be processed next on the level 2. Similarly, the OLD IAR's 2 to 4 of the levels 3 to 5 respectively update their values during processings on the respective levels 3 to 5 by storing an address of the next instruction but stop the update when the processing shifts to a higher level. Since the uppermost level 1 is never caused to pause by an interruption, no OLD IAR is provided for the uppermost level.

A selector 28 includes, as shown in FIG. 2 in detail, an A selector 22 for selecting one of output signals L2 to L5 of the OLD IAR's 1 to 4, a B selector 24 for selecting one of process start addresses A1 to A4 for processings on the levels 1 to 4, and a C selector 26 responsive to control signals 17 and 18 delivered out of a process level decision circuit 46, an initial program load (IPL) start command signal 19, an IAR update command signal 20 and a branch command signal 21 from an instruction decoder 44 to select from an output signal 23 of A selector 22, an update address 11, an output signal 25 of B selector 24, an IPL start address 9 and a branch destination address 10.

The A selector 22 operates in accordance with a function diagram shown in FIG. 3A. More particularly, the A selector 22 selects one of the contents L2 to L5 of the OLD IAR's 1 to 4 associated with the levels 2 to 5 which matches the "1" level of process level signals 13 to 16 for the levels 2 to 5 and delivers the output signal 23 representative of an old instruction address. For example, the contents L2 of OLD IAR 1 of the level 2 is selected and delivered when the process level signal 13 for the level 2 is "1".

The start addresses A1 to A4 inputted to the B selector 24 have each a 31-bit value indicative of a process start address of each level 1, 2, 3 or 4. In this embodiment, hexadecimal values "X'00000100'", "X'00000200'", "X'00000300'" and "X'00000400'" are allotted to the levels 1 to 4, respectively. Each of the IPL start address 9 and branch destination address 10 also has a 31-bit value.

The B selector 24 operates in accordance with a function diagram shown in FIG. 3B so as to select one of the start addresses A1 to A4 of the levels 1 to 4 which matches the "1" level of process level signals 12 to 15 for the levels 1 to 4 and deliver the output signal 25 representative of a start address 25.

The C selector 26 operates in accordance with a function diagram shown in FIG. 3C so as to select one of the old instruction address 23, start address 25, IPL start address 9, update address 11 and branch destination address 10 which matches the "1" level of OLD IAR→IAR command signal 17, start address →IAR command signal 18, IPL start command signal 19., IAR update command signal 20 and branch command signal 21 and deliver an output signal 27 representative of an output IA of the selector 28.

Returning to FIG. 1, an instruction address register (IAR) or program counter 29 stores the output signal 27 from the C selector 26, a multiplier 30 multiplies by two the value of a 2-bit instruction length code (ILC) 50 delivered out of the instruction decoder 44, and an adder 32 adds an output signal 31 of the IAR 29 and an output signal of the multiplier 30 to deliver the update address 11.

The update address 11 calculated at the adder 32 is of a 31-bit value and is applied to the OLD IAR's 1 to 4 of the levels 2 to 4 as well as to the C selector 26.

Figure 4:
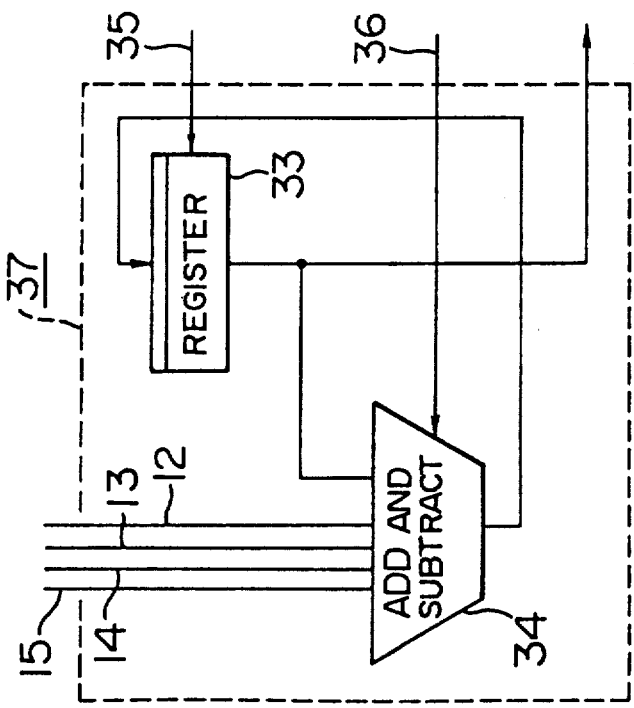
FIG. 4 is a diagram showing details of an old level holder 37 in the FIG. 1 system.

An old level holder 37 includes, as shown in FIG. 4, an old level hold register 33 for recording a level being presently processed and all of levels which are caused by interruption to pause till now, and an adder/subtracter 34 for changing the contents of the old level hold register 33. The old level hold register is controlled by a 1-bit signal 35 which is delivered out of the process level decision circuit 46 and which assumes "1" for commanding change of the contents of the old level hold register 33 and "0" for the other operation. The adder/subtracter 34 is controlled by a signal 36 which assumes "1" for commanding addition and "0" for commanding subtraction. The old level holder 37 operates in accordance with a function diagram shown in FIG. 5.

Figure 6:
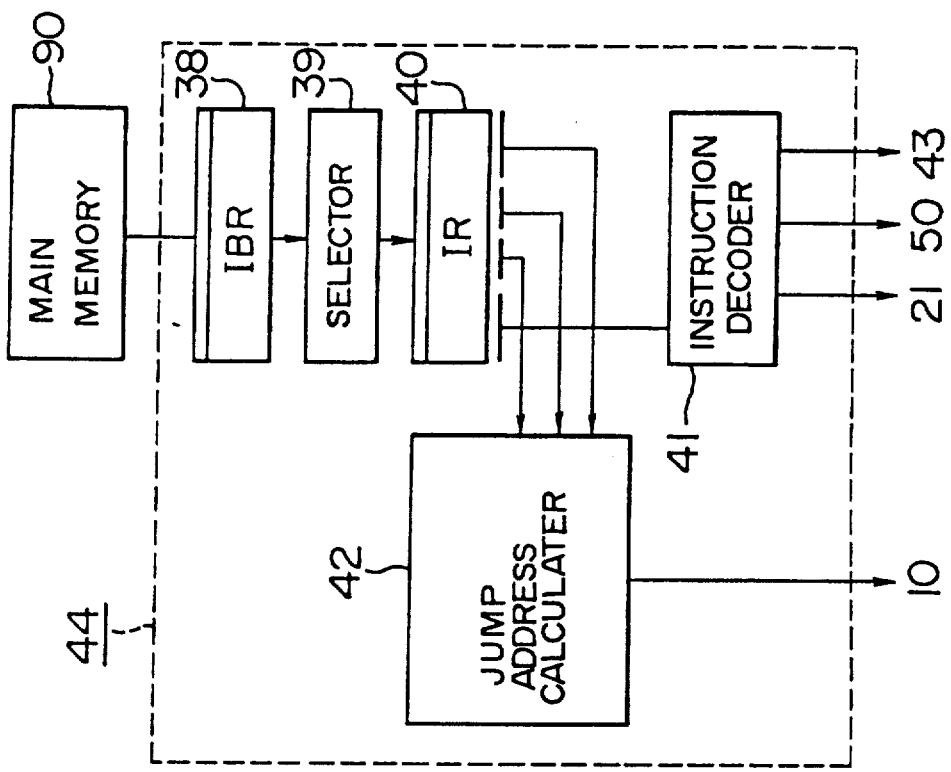
FIG. 6 is a block diagram showing details of an instruction decoder in the FIG. 1 system.

Turning to FIG. 1, the instruction decoder 44 reads an instruction at an address on main memory which is designated by the IAR 29 and performs decoding of this instruction and calculation of a branch address. As shown in FIG. 6, the instruction decoder 44 includes an instruction buffer register (IBR) 38 for storing a group of instructions read out of a main memory 90, a selector 39 for selecting an instruction to be processed from the instructions stored in the IBR, an instruction register (IR) 40, an instruction decode circuit 41 which decodes the instruction in the IR 40 to deliver the 1-bit branch command signal 21, 2-bit ILC 50 and a 1-bit signal 43 for informing generation of an EXIT instruction, and a jump address calculator 42 responsive to the instruction in the IR 40 to calculate and deliver the branch destination address 10. The EXIT instruction generation informing signal 43, together with interruption request signals 45, is applied to the process level decision circuit 46.

Returning again to FIG. 1, an old ILC holder 52 includes a register 53 adapted to store the instruction length code (ILC) of an instruction which is being placed in execution on an interrupted level immediately before the occurrence of a supervisor interruption (SVC INT) when the SVC INT is acknowledged and abbreviated as an SVC-INT OLD ILCR 53, and a register 54 adapted to store the ILC of an instruction which is being placed in execution immediately before the occurrence of a program interruption (PROG INT) when the PROG INT is acknowledged and abbreviated as a PROG-INT OLD ILCR 54.

The process level decision circuit (control circuit) 46 delivers various control signals 12 to 18, 35, 36, 48, 49 and 51. The signals 12 to 16 respectively indicate that the levels 1 to 5 are in processing, and one of the process level signals 12 to 16 which corresponds to a level being placed in processing assumes "1" with the remaining process level signals assuming "0". The 1-bit signal 17 (OLD IAR→IAR command signal) assumes "1" when it commands storage of the contents of old IA 23 in the IAR 29 and "0" for the other operation. The 1-bit signal 18 (start address→IAR command signal) assumes "1" when the process level decision circuit 46 stores the start address 25 in the IAR 29 and "0" for the other operation. The 1-bit signal 19 (IPL start command signal) assumes "1" for commanding start of the IPL and "0" for the other operation. The 1-bit signal 20 (IAR update command signal) assumes "1" for commanding update of the IAR 29 and "0" for the other operation.

A plurality of interruption request signal lines 45 correspond to classifications of interruption. When an interruption request occurs, one of signal lines 45 corresponding to the occurring interruption assumes "1". With the interruption acknowledged, a signal 48 indicative of a classification of the interruption and a signal 49 for commanding recording of the interruption classification are delivered and the interruption classification is recorded in a register 47. A signal 51 is a 2-bit signal corresponding to the old ILCR 53 or 54 and is adapted to store the value of ILC 50 in either the register 53 or 54 corresponding to an upper or lower bit assuming "1".

The contents of the OLD IAR's 1 to 4, old level hold register 33, OLD-ILCR's 53 and 54 and interruption classification register 47 are looked up by the program. For example, when an error occurs during the execution of a certain program, an error process program (or routine) started by an interruption can know which step is placed in execution when the trouble occurs and which program the step belongs to by looking up the contents of each of the above registers.

The process level decision circuit 46 will now be described. The process level decision circuit 46 is a logic circuit which, when supplied with the interruption request signal 45 or the EXIT instruction generation informing signal 43 generated during the execution of an EXIT instruction inserted in the last step of one routine, generates various control signals necessary for pause of a routine presently executed, switching of this routine to an interrupting routine of higher priority or return of the interrupting routine to the pausing routine after completion of the interrupting routine. The process level decision circuit 46 operates in accordance with flow charts shown in FIGS. 7A and 7B.

The process level decision circuit 46 responds to the interruption request signal 45 or the EXIT instruction generation informing signal 43. Particularly, responsive to the interruption request signal, the circuit 46 decides whether the presently inputted interruption request signal is toward a higher level than that of a routine presently processed (steps 101 and 102). In the case of the input signal being the EXIT instruction generation informing signal, the circuit 46 carries out step 110 and ensuing steps shown in FIG. 7B.

If the presently occurring interruption request is toward a lower level than that of the presently processed routine, the level of the interruption request is stored in a pending information register 55 to permit the present process to continue (steps 103 and 104). If the level of the interruption request is higher than that of the presently processed routine, a higher level routine corresponding to that interruption request is executed while various types of information for the presently processed routine are stored or saved in the registers 1 to 4, 47 and 52, in steps 105 to 109. The level of the presently processed routine can be known by looking up the contents of the old level hold register 33.

With the interruption acknowledged, the classification of the interruption to the routine presently executed is first stored in the register 47 (step 105). In this example, the interruption is classified into a supervisor (SVC) interruption, a program (PROG) interruption and the other and the former two classifications are storable. The interruption classification signal 48 has two bits respectively corresponding to the SVC and PROG interruptions. Thus, in step 105, a bit of interruption classification signal 48 corresponding to the classification of the present interruption is first rendered "1" and the signal 49 for commanding change of the interruption classification hold register is rendered "1" so that "1" may be stored in a bit of interruption classification hold register 47 corresponding to the present interruption classification. Thereafter, the interruption classification hold register change commanding signal 49 is rendered "0". However, if the interruption classification signal 48 does not have a bit corresponding to the present interruption classification, the above-mentioned signals will not be generated.

Subsequently, in step 106, the instruction length code (ILC) produced from the instruction decoder onto a signal line, also designated by reference numeral 50 representative of ILC, is stored in the old ILC holder 52. To this end, a bit of old ILCR storage commanding signal 51 corresponding to the present interruption classification is rendered "1" so that the value of ILC 50 may be stored in one of the old ILCR's 53 and 54 which corresponds to the present interruption classification and thereafter a bit of old ILCR storage commanding signal 51 corresponding to the present interruption classification is rendered "0". But if the old ILCR storage commanding signal 51 does not have a bit corresponding to the present interruption classification, this processing will be omitted.

The process level decision circuit 46 renders "1" one of the process level signal lines 12 to 16 which corresponds to the level presently executed and "0" the other, thereby ensuring that an address of an instruction delivered out of the adder 32 and scheduled to be executed next can be stored in one of the OLD IAR's 1 to 4 during the execution of a processing on the level 2, 3, 4 or 5. With a new interruption acknowledged, a process level signal line for a level corresponding to the interruption is rendered "1" and process level signal lines for other levels are rendered "0" (step 107). This causes an OLD IAR corresponding to the level processed till then to pause while permitting this OLD IAR to hold an address of an instruction to be executed next and causes another OLD IAR corresponding to a new process level to operate. When the state of the process level signal lines 12 to 16 changes, the B selector 24 selects one of the process start addresses A1 to A4 which corresponds to the new interruption level and delivers the selected start address on the signal line 25. In step 108, the process level decision circuit 46 renders "1" the signal line 18 so that the C selector 26 may be permitted to select the output signal 25 of the B selector 24 and the start address may be set in the IAR 29, and thereafter the signal line 18 is returned to "0".

In step 109, the process level decision circuit 46 renders "1" the signal lines 35 and 36 so as to update the contents of the old level hold register 33. The old level hold register 33 has four bits corresponding to the levels 1 to 4, respectively. Under the application of the addition/subtraction command signal 36 of "1" to the adder/subtracter 34, the contents of the register 33 is added to four bits on the level signal lines 12 to 15 and "1" is added to a bit position of register 33 corresponding to the newly acknowledged interruption level. Under this condition, "1" is also stored in a bit of register 33 corresponding to the level caused to pause by the interruption.

When the process level decision circuit completes the generation of the above signals, the data processor starts to continue (or resume) processing (step 104). Because the start address of the routine corresponding to the acknowledged interruption level has been set in the IAR, instructions in the routine starting from this start address are sequentially read out of the main memory and applied to the instruction decoder 44.

Figure 7A:
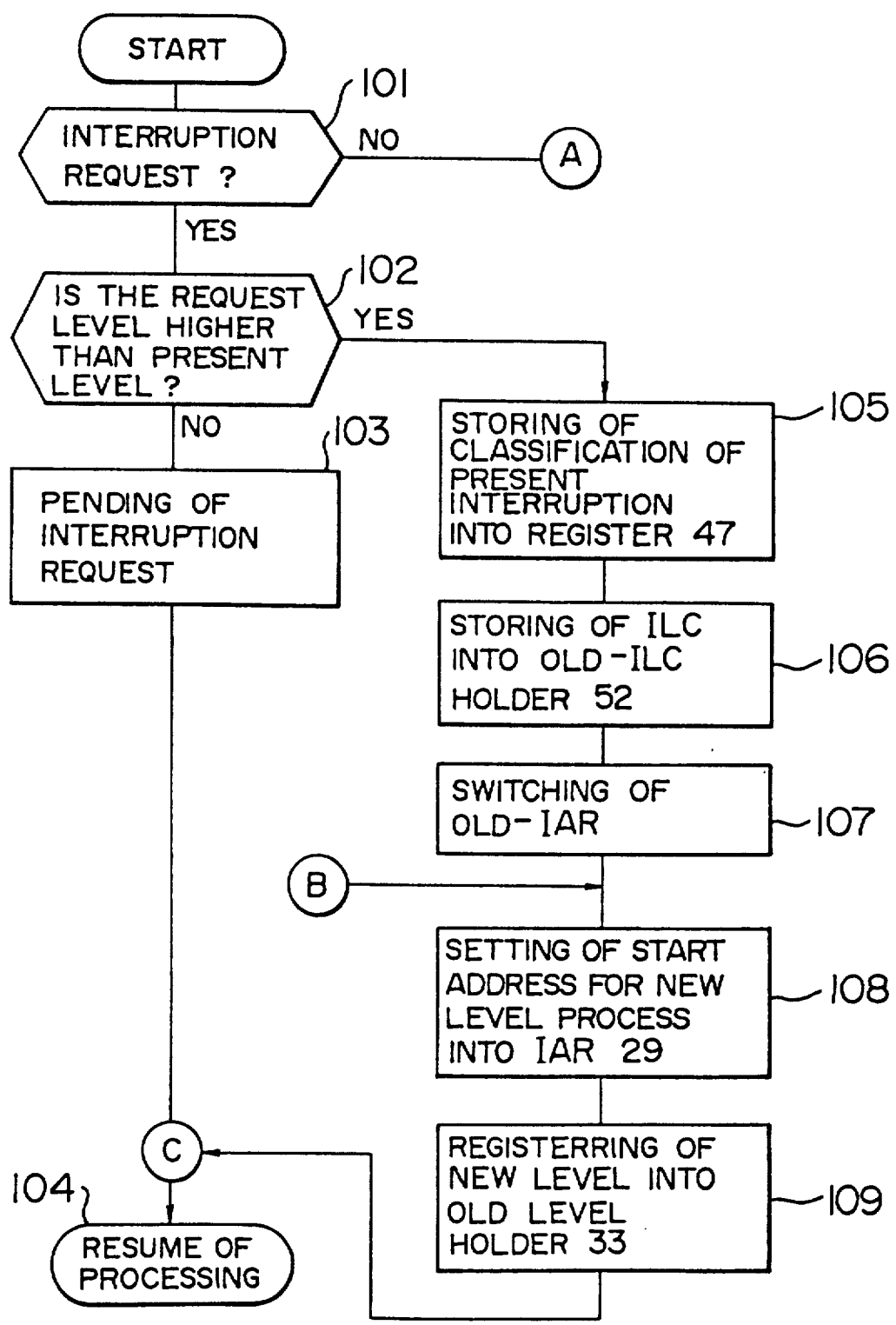
FIGS. 7A and 7B are flow charts for explaining the function of a process level decision circuit 46 in the FIG. 1 system.
Figure 7B:
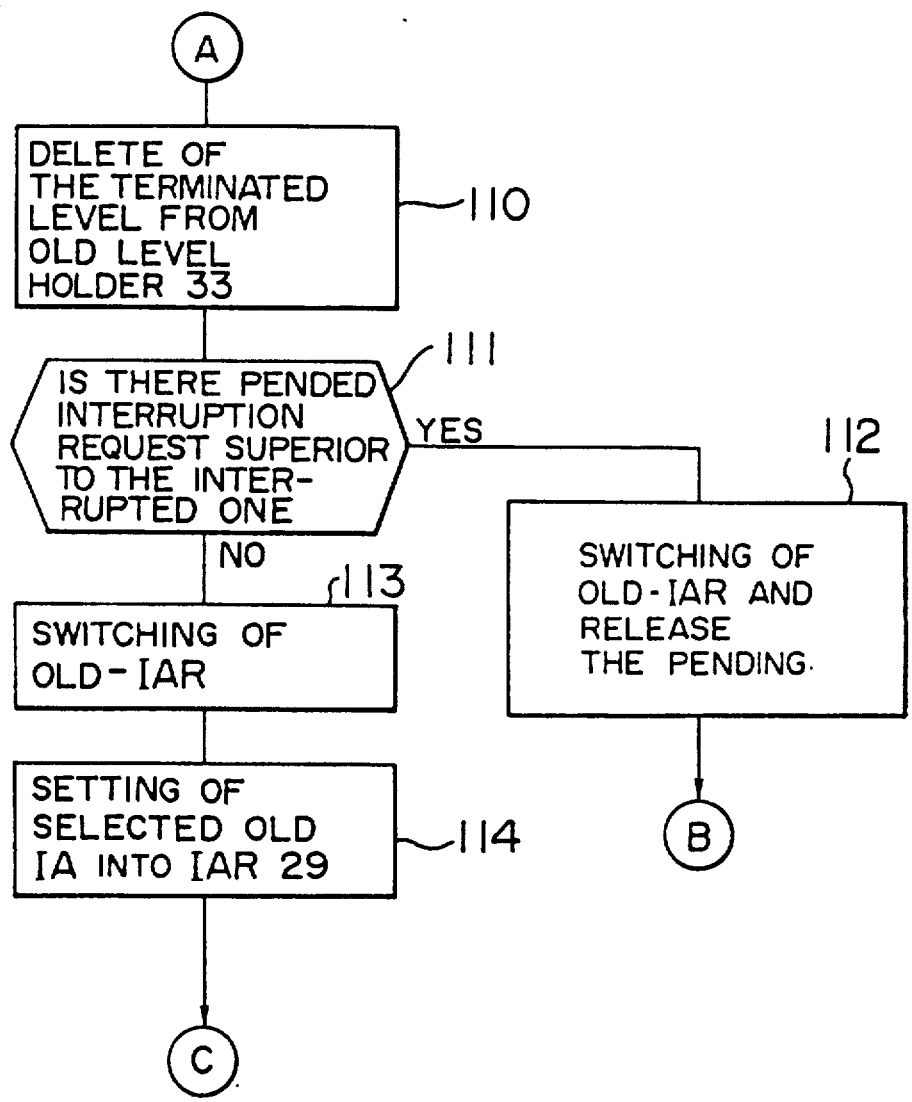

When the EXIT instruction is executed in the routine on the levels 1 to 4, a bit of old level hold register 33 corresponding to the level whose execution is completed presently is cleared to zero, as shown in step 110 of FIG. 7B. This can be done by rendering "0" the addition/subtraction command signal 36 and "1" the signal 35 to permit the output signal of the adder/subtracter 34 to be set in the register 33 and thereafter returning the signal 35 to "0". If there is a pausing interruption process except level 5, "1" remains in a bit position of register 33 corresponding to the pausing process level. Accordingly, of the pausing process levels, the uppermost process level is treated as a process level to be resumed next. However, if an interruption of a higher level than that of the uppermost pausing process level has been registered in the pending register 55, it is necessary to preferentially acknowledge the pending interruption.

In step 111, it is decided whether the interruption process registered in the pending register 55 is to be executed next or whether the interruption process registered in the old level hold register 33 is to be executed next. If the former case occurs, the process level decision circuit 46 renders "1" one of the process level signal lines 12 to 16 which corresponds to the level of the pending interruption and "0" the other, thereby switching the OLD-IAR's 1, 2, 3, 4, and release the pending state (step 112) and thereafter the procedure proceeds to steps 108 and 109.

In the absence of an interruption to be executed next which has been stored in the pending register 55, the uppermost process level registered in the form of "1" bit in the old level hold register 33 is selected, a process level signal corresponding to the uppermost process level is rendered "1", and the remainder is rendered "0" (step 113). If there is no "1" bit in the register 33, the process level signal 16 for the level 5 is rendered "1". This causes the A selector 22 to select the contents of one of the OLD IAR's 1 to 4 which corresponds to the process level to be resumed, and an instruction address is produced on the output line 23. Then, in step 114, the signal line 17 is rendered "1" to permit the C selector 26 to select the output line 23, so that the instruction address to be executed next may be set in the IAR 29. After completion of setting of the instruction address in the IAR, the signal line 17 returns to "0". In this manner, the pausing routine can be resumed.

Figure 8:
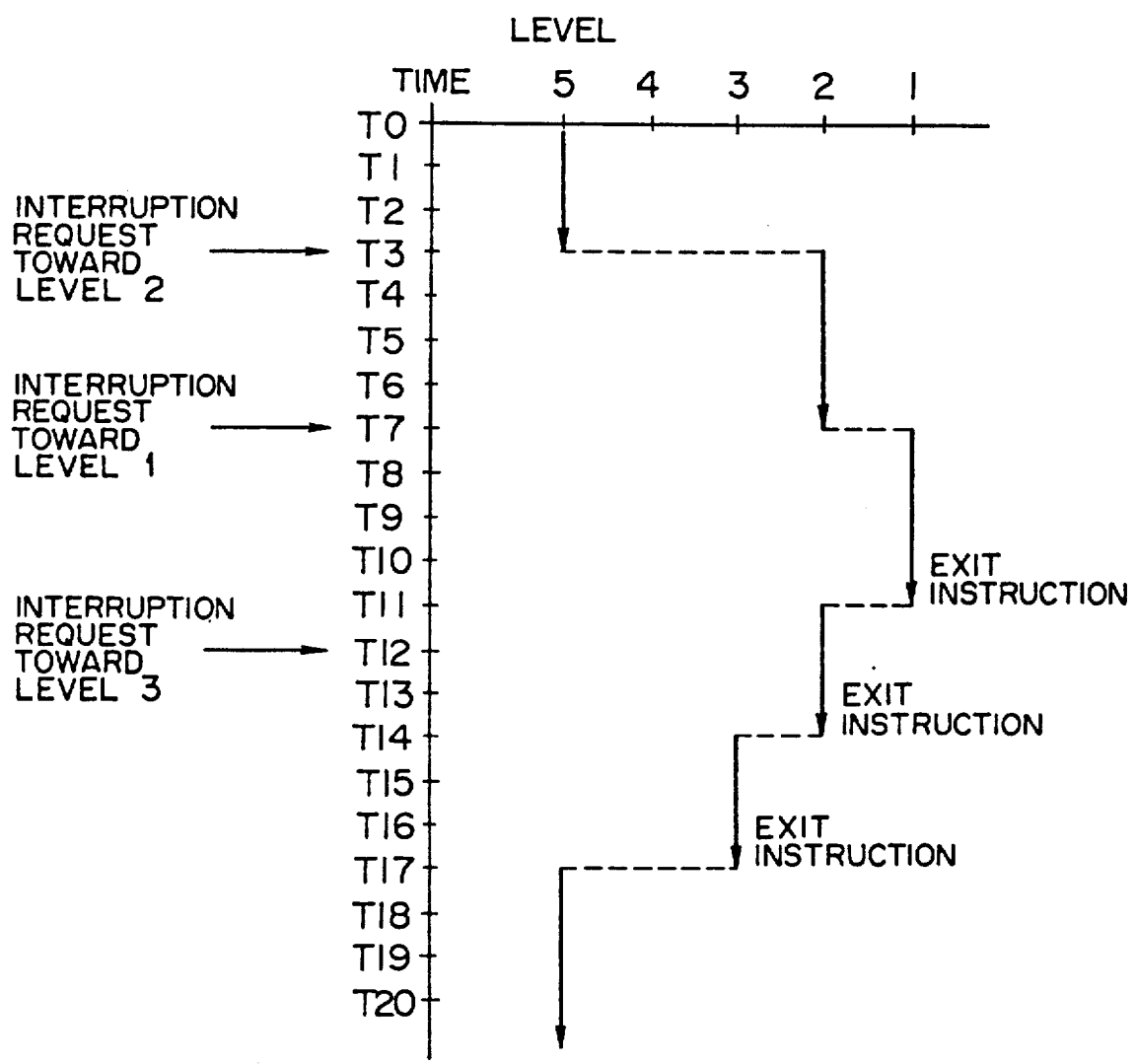
FIG. 8 is a sequence flow chart useful to explain an example of interruption processing in the system of the present invention.

The change of state of the old level hold register 33 will be explained with reference to FIGS. 9A to 9F by taking a processing shown in an interruption process sequence chart of FIG. 8 as an example.

Bits 1 to 4 of the old level hold register 33 correspond to the levels 1 to 4, respectively, as shown in FIG. 9A. During a period from time 0 to time 2 shown in FIG. 8, the level machine type information processing system processes the lowermost level 5 and at that time the contents of the old level hold register 33 is represented by "0" at all the bits as shown in FIG. 9A. At time 3, an interruption request toward level 2 occurs and the processing shifts to the level 2. Subsequently, during a period from time 4 to time 6, the contents of the old level hold register 33 is represented by "1" only at the bit 2 as shown in FIG. 9B. Then, the state of the register 33 indicates that the level presently processed is the level 2 and the pausing level is the level 5. The old level hold register 33 does not have a bit corresponding to the level 5. This is because during a processing on a level other than the level 5, the level 5 is always caused to pause and there is no need of providing the corresponding bit. At time 7, an interruption request toward level 1 occurs and the procedure shifts to the level 1. Subsequently, during a period from time 8 to time 10, the contents of the old level hold register 33 is represented by "1" at the bits 1 and 2. Then, the state of the register 33 indicates that the presently processed level is the level 1 and the pausing levels are the levels 2 and 5. When the EXIT instruction is issued on the level 1 and the processing on the level 1 completes at time 11, the processing on the pausing level 2 is resumed. Subsequently, during a period from time 12 to time 13, the contents of the old level hold register 33 is represented by "1" at only the bit 2 as shown in FIG. 9D. At time 12, an interruption request toward level 3 occurs but because of priority of the presently processed level 2 superior to that of the interrupting level 3, this interruption request becomes pending. When the EXIT instruction is issued on the level 2 and the processing on the level 2 completes at time 14, the pending interruption request toward level 3 is acknowledged and the procedure shifts to the level 3. Subsequently, during a period from time 15 to time 16, the contents of the old level hold register 33 is represented by "1" at only the bit 3 as shown in FIG. 9E. When the EXIT instruction is issued on the level 3 and the processing on the level 3 completes at time 17, the processing on the pausing level 5 is resumed. Subsequently, during a period from time 18 to time 20, the contents of the old level hold register 33 is represented by "0" at all the bits as shown in FIG. 9F.

When an interruption is acknowledged during a processing on a certain level to start a processing on a level of higher priority than that of the level presently processed, an address of an instruction executed on the interrupted level immediately before the occurrence of the interruption can be calculated by subtracting, after start of the processing on the interrupting level of higher priority, twice a value of the old ILCR 53 or 54 corresponding to an interruption classification indicated by the interruption classification hold register 47 from a value of one of the OLD IAR's 1 to 4 corresponding to the interrupted level indicated by the old level hold register 33. This ensures that even when the interrupting level is a level other than the level of the highest priority, an address of an instruction immediately before the interruption can be calculated.

While the prior art system needs 31 bits for the capacity of the LAR's, the present embodiment needs 2 bits for each of the old ILCR's 53 and 54, 4 bits for the old level hold register 33 and 2 bits for the interruption classification hold register 47, amounting to 10 bits in total and can reduce the amount of hardware.

Although in the present embodiment an address of an instruction executed on an interrupted level immediately before the occurrence of an interruption can be determined only when the interruption classification is the SVC interruption or the program interruption, an address of an instruction executed on the interrupted level immediately before the occurrence of an interruption of another classification can be determined by providing additional old ILCR's corresponding to other interruption classifications.

In a second embodiment of the invention, the old ILC holder 52 comprised of the two registers differently used in accordance with the interruption classification as shown in FIG. 1 may be modified to include a single register 57 as shown in FIG. 10. In the second embodiment, the process level decision circuit 46 may be operable to render "1" the latch signal 51 irrespective of the interruption classification in the step 106 of FIG. 7A and return the latch signal 51 to "0" after the ILC 50 has been set in the register 57. With this construction, when an interruption is acknowledged during a processing on a certain level to start a processing on a level of higher priority than that of the level presently processed, an address of an instruction executed on the interrupted level immediately before the occurrence of the interruption can be determined regardless of the interrupting level by subtracting, after start of the processing on the interrupting level of higher priority, twice a value of the old ILCR 57 from a value of one of the OLD IAR's 1 to 4 corresponding to the interrupted level indicated by the old level hold register 33.

While the prior art system needs 31 bits for the capacity of the LAR's, the second embodiment needs 2 bits or the old ILCR 57 and 4 bits for the old level hold register 47, amounting to 6 bits in total and can reduce the amount of hardware.

Referring to FIG. 11, a third embodiment of the invention will be described herein the old ILC holder 52 shown in FIG. 1 may further be modified. More particularly, an old ILC holder 52 according to the third embodiment includes four old ILC registers 58-2 to 58-5 corresponding to the interruption levels 2 to 5, and the latch signal 51 has four bits corresponding to the number of the registers 58-2 to 58-5. In the third embodiment, the process level decision circuit 46 may be operable to deliver, in the step 106 of FIG. 7A, the latch signal 51 having a "1" bit corresponding to a level presently processed and "0" bits corresponding to the remaining levels and return all the bits of the latch signal to zero after the ILC 50 has been latched in one of the old ILC registers.

In accordance with the third embodiment, when an interruption is acknowledged during a processing on a certain level to start a processing on a level of higher priority than that of the level presently processed, an address of an instruction executed on the interrupted level immediately before the occurrence of the interruption can be determined regardless of the interrupting level by subtracting, after start of the processing on the interrupting level of higher priority, twice a value of one of the old ILC registers 58-2 to 58-5 corresponding to the interrupted level indicated by the old level hold register 33 from a value of one of the OLD LAR's 1 to 4 corresponding to the interrupted level indicated by the old level hold register 33.

The present embodiment is further advantageous in that it is possible to determine an address of an instruction executed, immediately before the interruption, on a processed level which precedes the presently processed level by not only one but also two or more. An instance where the processed level precedes by two or more will be described with reference to FIGS. 8 and 9C.

The contents of the old level hold register 33 during a period from time 8 to time 10 as shown in FIG. 9C indicates that the processed level which precedes the presently processed level 1 by one is the level 2 and the processed level which precedes the presently processed level by two is the level 5. An address of an instruction processed, immediately before the interruption, on the processed level which precedes the presently processed level by two can be determined by subtracting, during the processing on the level 1, twice a value of the old ILC register 58-5 for the level 5 from a value of the OLD IAR 4 for the level 5.

Thus, the present embodiment has the following particular advantage. More specifically, when an interruption toward level 2 due to page absence occurs during processings on the levels 5 to 3, an interruption toward level 1 due to program error on the level 2 occurs during execution, on the level 2, of a processing corresponding to the page absence, and the processing on the level 1 recognizes that the program error is an error which can not be recovered by the program and this processing is terminated, it is possible for the present embodiment to know, after end of the procedure, how far the original processings on the levels 5 to 3 have proceeded. In this way, the present embodiment can provide a method for maintenance and diagnosis.

While the prior art system needs 31 bits for the LAR's, the present embodiment needs 2 bits for each of the old ILC registers 58-2 to 58-5 and 4 bits for the old level hold register 33, amounting to 12 bits in total and can reduce the amount of hardware.

Although in the present embodiment the old ILC registers are provided in association with all of the levels 2 to 5, some of the old ILC registers may be provided for only levels which requires, after interrupted, an address of an instruction executed immediately before the interruption. In this case, the amount of hardware can further be reduced.

Figure 12:
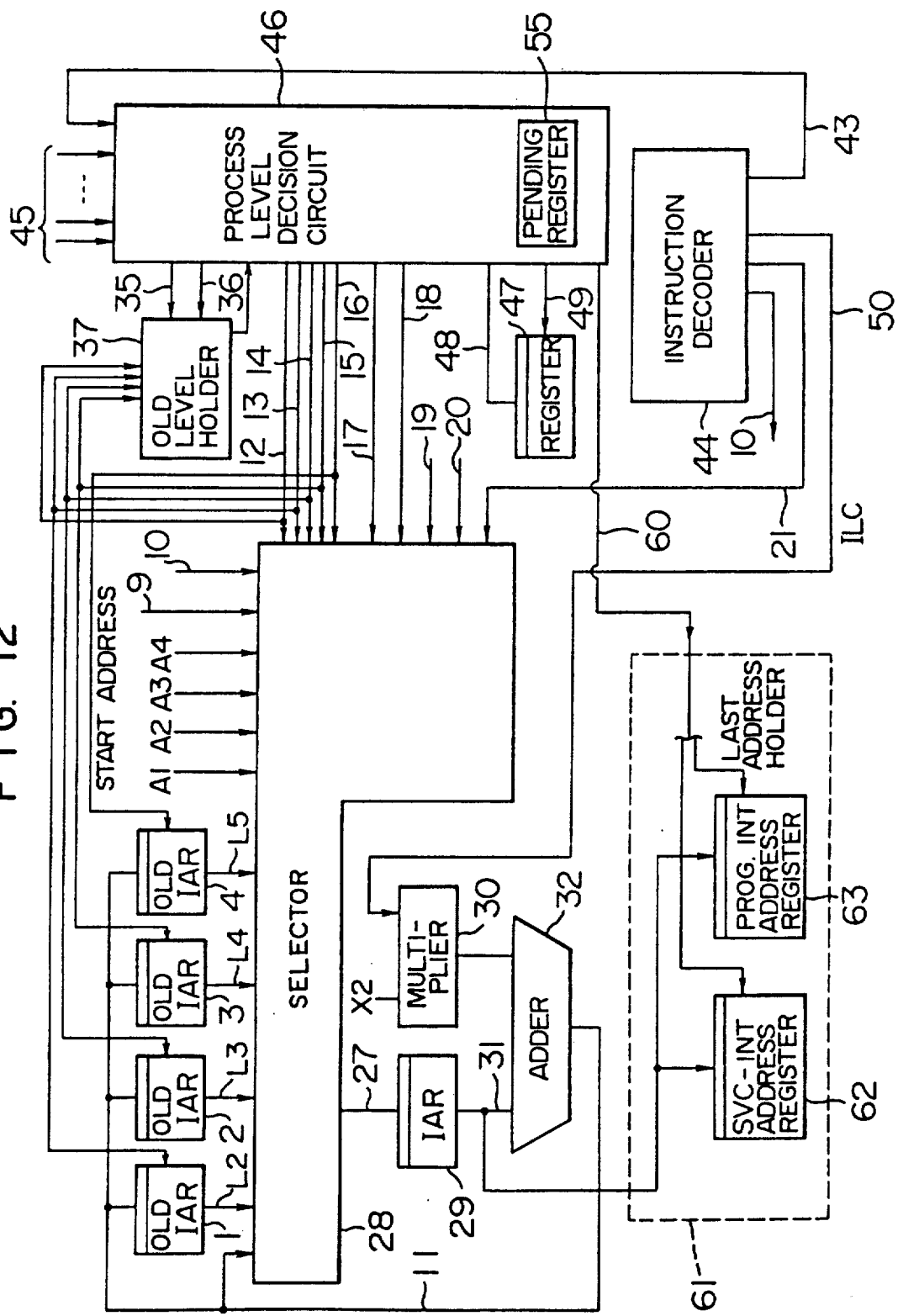
FIG. 12 is a schematic block diagram illustrating another embodiment of the level machine type information processing system according to the invention.

FIG. 12 shows a fourth embodiment of the invention. In the fourth embodiment, a last address (an address immediately preceding an interruption) holder 61 substitutes for the old ILC holder 52 of FIG. 1 and includes last address registers 62 and 63 which respectively correspond to SVC and program interruptions and directly store the output signal of the IAR 29. When an SVC interruption is acknowledged, the register 62 records an address of an instruction executed immediately before the interruption. Similarly, when a program interruption is acknowledged, the register 63 records an address of an instruction executed immediately before the interruption. Denoted by 60 is a latch command signal applied to the last address register and which has, in this embodiment, two bits respectively corresponding to the SVC and program interruptions.

In this embodiment, the process level decision circuit 46 renders "1", in the step 106 of FIG. 7A, a bit of latch signal 60 corresponding to an interruption request presently executed to cause one of the registers 62 and 63 to store a value of the output address of the IAR 29 and thereafter renders the bit "0".

In accordance with the fourth embodiment, when an interruption is acknowledged during a processing on a certain level to start a processing on a level of higher priority than that of the presently processed level, an address of an instruction executed immediately before the interruption can be determined, after start of the processing on the level of higher priority, from a value of one of the last address registers 62 and 63 corresponding to an interruption classification indicated by the interruption classification hold register 47 even when the interrupting level is other level than the level of the highest priority.

Although in the present embodiment an address of an instruction executed on an interrupted level immediately before the occurrence of an interruption can be determined only when the interruption classification is the SVC interruption or the program interruption, an address of an instruction executed on the interrupted level immediately before the occurrence of an interruption of another classification can be determined by providing additional last address registers corresponding to other interruption classifications.

In a fifth embodiment of the invention, the last address holder 61 of FIG. 12 may be modified to include a single register and the fifth embodiment is analogous to the second embodiment. With this construction, when an interruption is acknowledged during a processing on a certain level to start a processing on a level of higher priority than that of the presently processed level, an address of an instruction executed on the interrupted level immediately before the interruption can be determined, after start of the processing on the level of higher priority, from a value of the last address register regardless of the interrupted level.

FIG. 13 shows a sixth embodiment of the invention. In this embodiment, the last address holder 61 includes four last address registers 65-2 to 65-5 and the latch signal 60 has four bits. In accordance with the sixth embodiment, the process level decision circuit 46 renders "0", in the step 106 of FIG. 7A, a bit of latch signal 60 corresponding to a level executed till then so that the output address 31 of the IAR 29 may be stored in one of the last address registers 65-2 to 65-5 corresponding to that level and thereafter the circuit 46 returns all bits of the signal 60 to zero.

In accordance with the present embodiment, when a processing on an interrupting level of higher priority than that of a certain level is started, during execution of the higher level, an address of an instruction executed on the interrupted level immediately before the occurrence of the interruption can be determined regardless of the interrupting level, after start of the interrupting routine, from a value of one of the last address registers 65-2 to 65-5 corresponding to the interrupted level indicated by the old level hold register 33.

The present embodiment is further advantageous in that it is possible to determine an address of an instruction executed, immediately before the interruption, on a processed level which precedes the presently processed level by not only one but also two or more. The old level hold register 33 records all processed levels which precede the presently processed level by one or more and from a value of a last address register corresponding to a previously processed level, an address of an instruction processed, immediately before the interruption, on a processed level which precedes by two or more can be determined. Since an address of an instruction executed, immediately before an interruption, on a processed level which precedes by two or more can be determined, an effective method for maintenance and diagnosis can be obtained.

Although in the present embodiment the last address registers 65-2 to 65-5 are provided in association with all of the levels 2 to 5, last address registers may be provided for only some levels which requires, after acknowledgement of an interruption, an address of an instruction executed immediately before the interruption.

Figure 14:
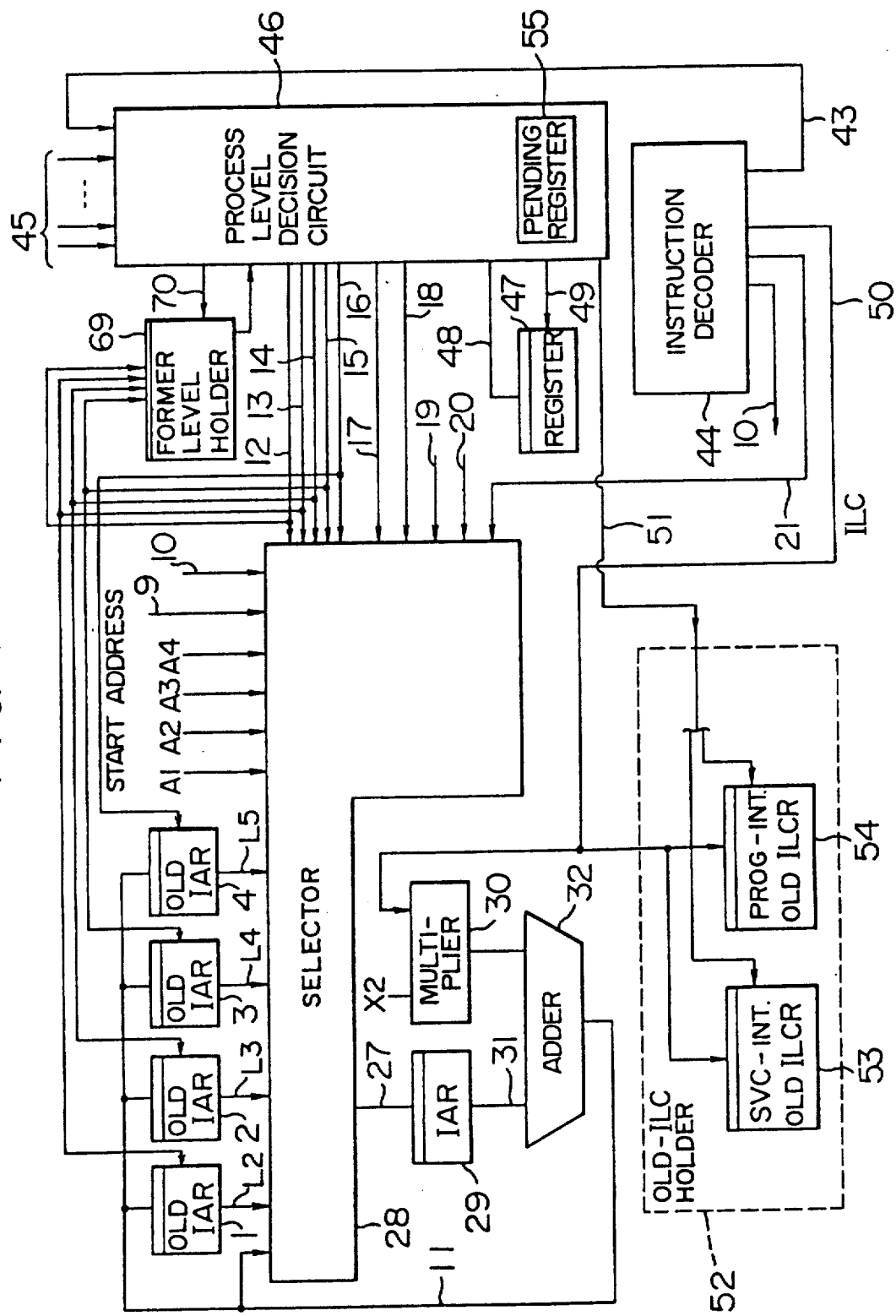
FIG. 14 is a schematic block diagram illustrating still another embodiment of the level machine type information processing system according to the invention.
Figure 16:
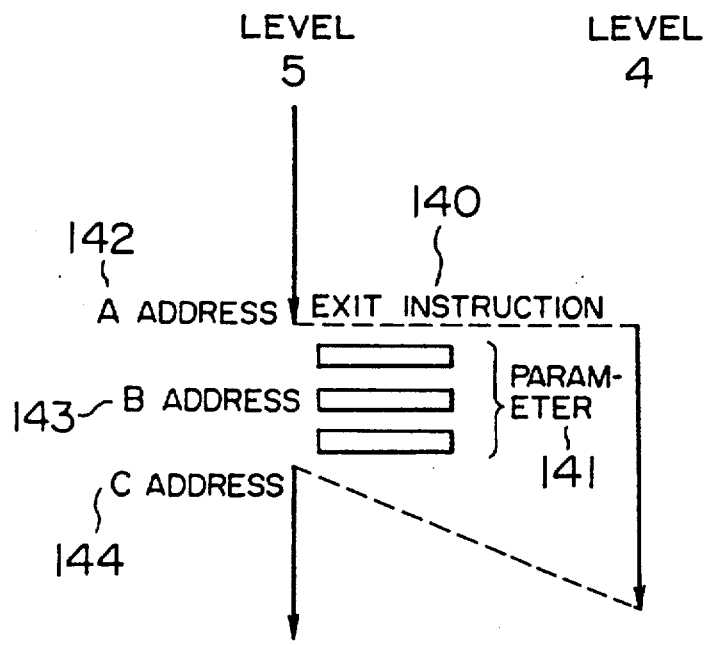
FIG. 16 is a diagram useful to explain the execution sequence of an EXIT instruction in a prior art system.
Figure 17:
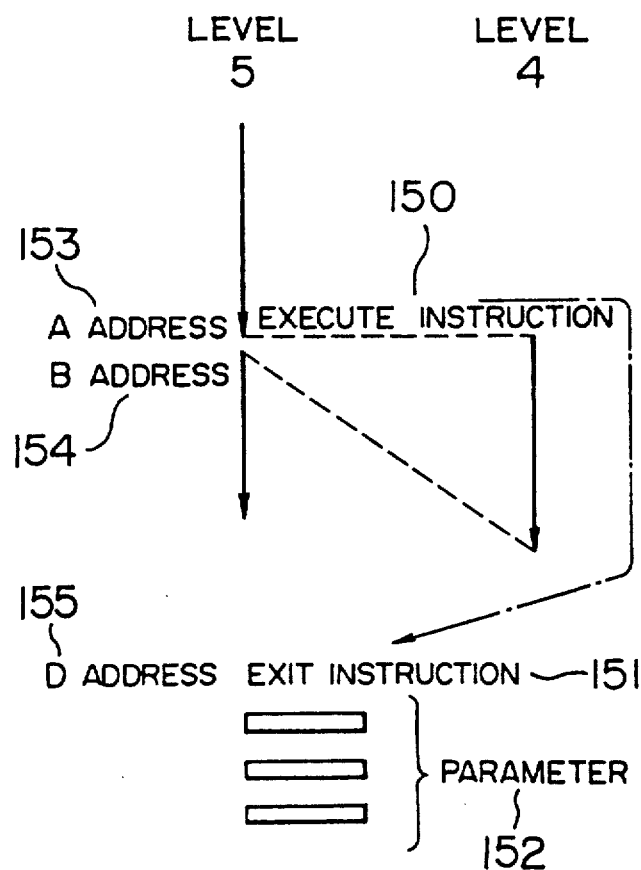
FIG. 17 is a diagram useful to explain the execution sequence of an EXECUTE instruction in the prior art system.

FIG. 14 shows a seventh embodiment of the invention. In this embodiment, the old level hold register 33 shown in FIG. 1 is replaced with a former level hold register 69 in which an interruption process level preceding an interrupted level presently processed by one is recorded. A latch signal 70 updates the contents of the register 69. In advance of execution of the step 105 of FIG. 7A, the process level decision circuit 46 renders "1" the latch signal 70 so that "1" may be recorded in a given bit of the former level hold register 69 corresponding to the process level presently executed. In this embodiment, the step 109 of FIG. 7A is omitted and the procedure proceeds to the step 104 after execution of the step 108. When the EXIT instruction generation informing signal 43 is inputted, the step 110 of FIG. 7B is omitted and steps ensuring the step 111 are executed.

FIGS. 15A to 15C show states of the former level hold register 69 during a period from time $T_0$ to time $T_2$, a period from time $T_4$ to time $T_6$ and a period from time $T_8$ to time $T_{20}$, respectively.

Bits 1 to 4 of the former level hold register 69 correspond to the levels 2 to 5, respectively, as shown in FIG. 15A. The contents of the former level hold register 69 during the period from time 0 to time 2 ($T_0$ to $T_2$) in FIG. 8 is represented by "0" at all the bits as shown in FIG. 15A. The contents of the former level hold register 69 during the period from time 4 to time 6 ($T_4$ to $T_6$) is represented by "1" at only the bit 4 corresponding to the level 5 as shown in FIG. 15B. Then, the state of the register 69 indicates that a processed level which precedes the presently processed level by one is the level 5. The contents of the former level hold register 69 during the period from time 8 to time 20 ($T_8$ to $T_{20}$) is represented by "0" at only the bit 1 corresponding to the level 2. This state of the register 69 indicates that a processed level which precedes the presently processed level by one is the level 2. After time 11, the EXIT instruction causes one level to shift to another but because of the EXIT instruction not being an interruption, the contents of the former level hold register 69 is not changed.

In accordance with the present embodiment, the adder/subtracter 34 and addition/subtraction command signal 36 can be omitted to simplify processing in the process level decision circuit 46.

As described above, according to the present invention, even when the interrupting level is other level than the level of the highest priority, an address of an instruction executed immediately before the interruption can be determined and therefore hierarchy of interruption processes can be realized to simplify preparation and maintenance of software. Further, since the EXECUTE instruction can be added to the instruction set, a different processing can be carried out without resort to rewrite of the procedure part of program by merely rewriting the contents of the general purpose registers, thereby permitting preparation of software having versatility for various processings. Since the program can be divided into the procedure part and data part which are maintained separately, rewrite of the procedure can be inhibited to prevent runaway of the program.

We claim:

1. An information processing system in which an instruction address for designating an instruction to be executed next in a process is saved corresponding to a priority level of the process when an interruption request for requesting execution of an other process having a higher priority level than that of the interrupted process presently executed is acknowledged, said system comprising:

first memory means for storing a plurality of sets of instructions defining a plurality of processing, respectively;

an instruction address register for supplying said first memory means with an address of an instruction to be read out therefrom;

instruction decoder means connected to receive the instruction read out from said first memory means for producing a plurality of control signals complying with the instruction;

calculator means connected to receive one of the control signals of said instruction decoder and the address outputted from said instruction register for generating a new address of an instruction to be executed next;

at least one first register means connected to receive the address outputted from said instruction address register for saving said address temporarily so as to be referred by any one of said processing;

a plurality of second register means provided in association with the respective priority levels different in each other and connected to receive the new address outputted from said calculator means for saving said new address temporarily;

means for providing a plurality of fixed addresses each of which represents a head address of a predetermined instruction set stored in said first memory means corresponding to a process to be executed in response to an interruption request having a priority level;

selector means for supplying a selected one of outputs of said calculator means, said plurality of second register means and said fixed addresses providing means, to said instruction register; and control means for comparing, when an interruption request occurs, a priority level of the interruption request with that of an interrupted process presently executed to decide whether the interruption request should be acknowledged, and for controlling said selector means, said first register means an a one of said second register means, whenever said interruption request is acknowledged, so as to save the output of said instruction address register in said first register means, the output of said calculator means in one of said second register means corresponding to the priority level of said interrupted process and thereafter set one of the outputs of said fixed addresses providing means corresponding to said interruption request in said instruction address register.

2. The information processing system according to claim 1 wherein said plurality of second register means comprises a plurality of register areas each corresponding to one of different priority levels excepting a highest one.

3. The information processing system according to claim 1 further comprising third register means for storing a priority level of a processing presently executed and fourth register means for storing at least one priority level of a interrupted process caused to pause by an acknowledged interruption request, the contents of said third and fourth register means being updated by said control means when each interruption request is acknowledged.

4. The information processing system according to claim 3 wherein said fourth register means comprises a plurality of register areas for storing the present state of interruption of respective priority levels excepting a lowest priority level.

5. The information processing system according to claim 1 wherein said control means includes means for controlling said selector means so as to transfer in said instruction address one of the outputs of said second register means to execute a processing of a lower priority level which has been caused to pause by an interruption request or one of the outputs of said fixed addresses providing means to execute a processing corresponding to a new interruption request, in response to another one of said control signals outputted from said decoder means which indicates an end of one interrupt process.

6. The information processing system according to claim 1 wherein said first register means comprises a plurality of register areas corresponding to the respective priority levels excepting a highest priority level and said control means operates a store, when said interruption request is acknowledged, the output of said instruction register in one of said register areas corresponding to an interruption priority level of presently executed process.

7. The information processing system according to claim 1 wherein said first register means comprises a plurality of register areas provided corresponding to classifications of interruption requests, and said control means operates to store, when said interruption request is acknowledged, the output of said instruction register in one of said register areas corresponding to an interruption classification to which a presently executed process belongs.

8. An information processing system in which an instruction address for designating an instruction to be executed next in a process is saved corresponding to a priority level of the process when an interruption request for requesting execution of a process having a higher priority level than that of the interrupted process presently executed is acknowledged, said system comprising:

first memory means for storing a plurality of instructions defining a plurality of processing, respectively;

an instruction address register for supplying said first memory means with an address of an instruction to be read out therefrom;

instruction decoder means connected to receive the instruction read out from said first memory means for producing a plurality of control signals complying with the instruction, one of said control signals representing a code indicative of the length of said instruction;

calculator means connected to receive one of the plurality of control signals complying with the instruction, one of said control signals representing a code indicative of the length of said instruction;

at least one first register means connected to receive said one control signal representing said instruction length code for saving said one control signal temporarily so as to be referred by any one of said processing;

a plurality of second register means provided in association with the respective priority levels different in each other and connected to receive the new address outputted from said calculator means for saving said new address;

means for providing a plurality of fixed addresses each of which represents a head address of a predetermined instruction set stored in said first memory means corresponding to a process to be executed in response to an interruption request having a priority level;

selector means for supplying a selected one of outputs of said calculator means, said second register means and said fixed addresses providing means, to said instruction register; and control means for comparing, when an interruption request occurs, a priority level of the interruption request with that of an interrupted process presently executed to decide whether the interruption request should be acknowledged, and for controlling said selector means, said first register means an a one of said second register means, whenever said interruption request is acknowledged, so as to save the instruction length code delivered out of said instruction decoder means in said first register means, the output of said calculator means in one of said second register means corresponding to the priority level of said interrupted process and thereafter set one of the outputs of said fixed addresses providing means corresponding to said interruption request in said instruction address register.

9. A level machine type information processing system according to claim 9 further comprising third register means for storing a level for a processing presently executed and a level for a processing caused to pause by an interruption, the contents stored in said third register means being updated by said control means.

10. The information processing system according to claim 9 wherein said fourth register means comprises a plurality of register areas for storing the present state of interruption of respective priority levels excepting a lowest priority level.

11. The information processing system according to claim 8 wherein said control means includes means for controlling said selector means so as to transfer in said instruction address register one of the outputs of said second register means to execute a processing of a lower priority level which has been caused to pause by an interruption request or one of the outputs of said fixed addresses providing means to execute a processing corresponding to a new interruption request, in response to another one of said control signals outputted from said decoder means which indicates an end of one interrupt process.

12. The information processing system according to claim 8 wherein said first register means comprises a plurality of register areas corresponding to the respective priority levels excepting a highest priority level and said control means operates to store, when said interruption request is acknowledged, said instruction length code in one of said register areas corresponding to an interruption priority level of presently executed process.

13. The information processing system according to claim 8 wherein said first register means comprises a plurality of register areas corresponding to classifications of interruption requests, and said control means operates to store, when said interruption request is acknowledged, said instruction length code in one of said register areas corresponding to an interruption classification to which a presently executed process belongs.

* * * * *

UNITED STATES PATENT AND TRADEMARK OFFICE
CERTIFICATE OF CORRECTION

PATENT NO. : 5,032,980

DATED : July 16, 1991

INVENTOR(S) : Seliichi Ozaki, et al

It is certified that error appears in the above-identified patent and that said Letters Patent is hereby corrected as shown below:

Claim 1, column 17, line 8, delete "an" and insert therefor --and--.

Claim 6, column 17, line 53, delete "a" and insert therefor --to--.

Claim 8, column 18, lines 20-22, delete "complying with the instruction, one of said control signals representing a code indicative of length of said instruction" and insert therefor --of said instruction decoder and the address outputted from said instruction register for generating a new address of an instruction to be executed next--.

Claim 8, column 18, line 30, delete "in" and insert therefor --to--.

Claim 8, column 18, line 48, delete "an" and insert therefor --and--.

Claim 9, column 18, lines 59-64, delete the entire claim and substitute therefor the following:

--The information processing system according to claim 8 further comprising third register means for storing a priority level of a process presently executed and fourth register means for storing at least one priority level of an interrupted process caused to pause by an acknowledged interruption request, the contents of said third and fourth register means being updated by said control means when each interruption request is acknowledged.--.

Signed and Sealed this

Fifth Day of January, 1993

*Attest:*

DOUGLAS B. COMER

*Attesting Officer*    *Acting Commissioner of Patents and Trademarks*